(12) United States Patent
Sabol

(10) Patent No.: US 8,593,474 B2
(45) Date of Patent: Nov. 26, 2013

(54) METHOD AND SYSTEM FOR SYMMETRIC ALLOCATION FOR A SHARED L2 MAPPING CACHE

(75) Inventor: Mark A. Sabol, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 286 days.

(21) Appl. No.: 11/322,922

(22) Filed: Dec. 30, 2005

(65) Prior Publication Data

US 2007/0153014 A1 Jul. 5, 2007

(51) Int. Cl.
*G09G 5/36* (2006.01)

(52) U.S. Cl.
USPC .......................................... 345/557; 345/558

(58) Field of Classification Search
USPC ................................................. 345/557–558
See application file for complete search history.

(56) References Cited

U.S. PATENT DOCUMENTS

| | | | | |
|---|---|---|---|---|
| 5,602,984 A | * | 2/1997 | Mieras | 345/557 |
| 5,615,167 A | * | 3/1997 | Jain et al. | 365/230.08 |
| 5,736,988 A | * | 4/1998 | Shaw et al. | 345/423 |
| 5,815,168 A | * | 9/1998 | May | 345/572 |
| 5,828,382 A | * | 10/1998 | Wilde | 345/552 |
| 5,877,780 A | * | 3/1999 | Lu et al. | 345/519 |
| 6,104,418 A | * | 8/2000 | Tanaka et al. | 345/531 |
| 6,226,707 B1 | * | 5/2001 | Mattela et al. | 711/3 |
| 6,353,438 B1 | * | 3/2002 | Van Hook et al. | 345/552 |
| 6,362,826 B1 | * | 3/2002 | Doyle et al. | 345/532 |
| 6,437,789 B1 | * | 8/2002 | Tidwell et al. | 345/557 |
| 6,462,747 B1 | * | 10/2002 | Oh | 345/552 |
| 6,496,193 B1 | * | 12/2002 | Surti et al. | 345/552 |
| 6,513,104 B1 | * | 1/2003 | Gaskins | 711/169 |
| 6,553,473 B1 | * | 4/2003 | Gaskins et al. | 711/169 |
| 6,650,332 B2 | * | 11/2003 | Doyle et al. | 345/532 |
| 6,674,441 B1 | * | 1/2004 | Frank | 345/503 |
| 6,999,091 B2 | * | 2/2006 | Saxena et al. | 345/566 |
| 7,760,804 B2 | * | 7/2010 | Ruttenberg et al. | 375/240.12 |
| 2001/0021971 A1 | * | 9/2001 | Gibson et al. | 712/215 |
| 2002/0069326 A1 | * | 6/2002 | Richardson et al. | 711/122 |
| 2002/0171652 A1 | * | 11/2002 | Perego | 345/542 |
| 2003/0093608 A1 | * | 5/2003 | Jaramillo et al. | 710/310 |
| 2003/0122837 A1 | * | 7/2003 | Saxena et al. | 345/566 |
| 2005/0268051 A1 | * | 12/2005 | Hill et al. | 711/158 |

(Continued)

FOREIGN PATENT DOCUMENTS

| | | |
|---|---|---|
| EP | 0 386 881 A2 | 9/1990 |
| WO | 99 26140 A1 | 5/1999 |

OTHER PUBLICATIONS

Steven Wallace and Nader Bagherzadeh, "Modeled and Measured Instruction Fetching Performance for Superscalar Microprocessors", IEEE Transactions on Parallel and Distributed Systems, IEEE Service Center, Los Alamitos, CA, US. vol. 9, No. 6, Jun. 1998, pp. 570-578, XP000765383, ISSN: 1045-9219.

(Continued)

*Primary Examiner* — Maurice L McDowell, Jr.
(74) *Attorney, Agent, or Firm* — Buckley, Maschoff & Talwalkar LLC

(57) ABSTRACT

A method, apparatus, system and medium for reading data from a tiled memory. In some embodiments a method may include for one tiled-X cache read request, requesting two cache lines from the tiled memory without fragmenting the tiled-X cache read request, and returning data associated with the two requested cache lines.

21 Claims, 5 Drawing Sheets

(56) References Cited

U.S. PATENT DOCUMENTS

| | | |
|---|---|---|
| 2005/0289298 A1* | 12/2005 | Savell et al. ............. 711/122 |
| 2006/0143384 A1* | 6/2006 | Hughes et al. ............. 711/130 |
| 2006/0168418 A1* | 7/2006 | Adusumilli ............. 711/169 |
| 2006/0179188 A1* | 8/2006 | Mimatsu et al. ............. 710/65 |
| 2006/0179237 A1* | 8/2006 | Fields et al. ............. 711/137 |
| 2006/0184737 A1* | 8/2006 | Yamada ............. 711/118 |

OTHER PUBLICATIONS

"PCT International Search Report of the International Searching Authority" mailed Jun. 6, 2007 for PCT/US2006/047304, 4pgs.

* cited by examiner

200

```
┌─────────────────────────────────────┐
│  FOR ONE TILED-X CACHE REQUEST,     │
│  REQUEST TWO CACHE LINES FROM THE   │
│  TILED MEMORY WITHOUT FRAGMENTING   │
│  THE TILED-X CACHE READ REQUEST     │
│                                 205 │
└─────────────────────────────────────┘
                   │
                   ▼
┌─────────────────────────────────────┐
│    RETURN DATA ASSOCIATED WITH      │
│    THE TWO REQUESTED CACHE LINES    │
│                                 210 │
└─────────────────────────────────────┘
```

FIG. 2

METHOD AND SYSTEM FOR SYMMETRIC ALLOCATION FOR A SHARED L2 MAPPING CACHE

BACKGROUND OF THE INVENTION

Cache memory systems may be used to generally improve memory access speeds in computer or other electronic systems. Increasing cache size and speed may tend to improve system performance. However, increased cache size and speed may be costly and/or limited by advancements in cache size and speed. Additionally, there may be a desire to balance overall system performance gains with overall system costs.

Different types of mapping methods may be used in a cache memory system, such as direct mapping, fully associative mapping, and set-associative mapping. For a set-associative mapping system, the cache memory is divided into a number of "sets" where each set contains number of "ways" or cache lines. Within each set, searching for an address is fully associative. There may be n locations or ways in each set. For example, in a 4-way, set-associative cache memory, an address at the data source may be mapped to any one of 4 ways 0, 1, 2, or 3 of a given set, depending on availability. For an 8-way set-associative cache memory, the address at the data source may be mapped to one of 8 ways or locations within a given set.

Memory management is crucial to graphics processing and manipulating the large amounts of data encountered therewith. As processing requirements increase for graphics, including 3-D (three dimensional) texturing, various aspects of memory allocation and mapping have been considered for improvement to increase graphics processing. In some instances, a memory for graphics data may be organized in tiles. Tile organized memory may allow faster access of graphics data as compared to linearly organized memory.

In some instances, the systems and methods for tile organized memory mapping may be directed to optimizing processing of "y-major" or "tiled-Y" read request operations. In a tiled-Y tiling scheme, two contiguous data structures in the Y-direction are consecutive in memory. Also, Y-major tiling may be an efficient method of organizing memory for graphics texture applications. Some graphics engines and graphics systems load texture data from a processor into cache memory in the Y-direction. Accordingly, a graphics engine or system may be configured or optimized to read graphics data (e.g., texture data) in the Y-direction. Such optimization may allow be tiled-Y read requests to be processed in one clock cycle. However, optimization for one type of operation may have undesired results regarding other operations.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

FIG. 2 is an exemplary flow diagram, in accordance with some embodiments herein;

DETAILED DESCRIPTION

Figure 1:
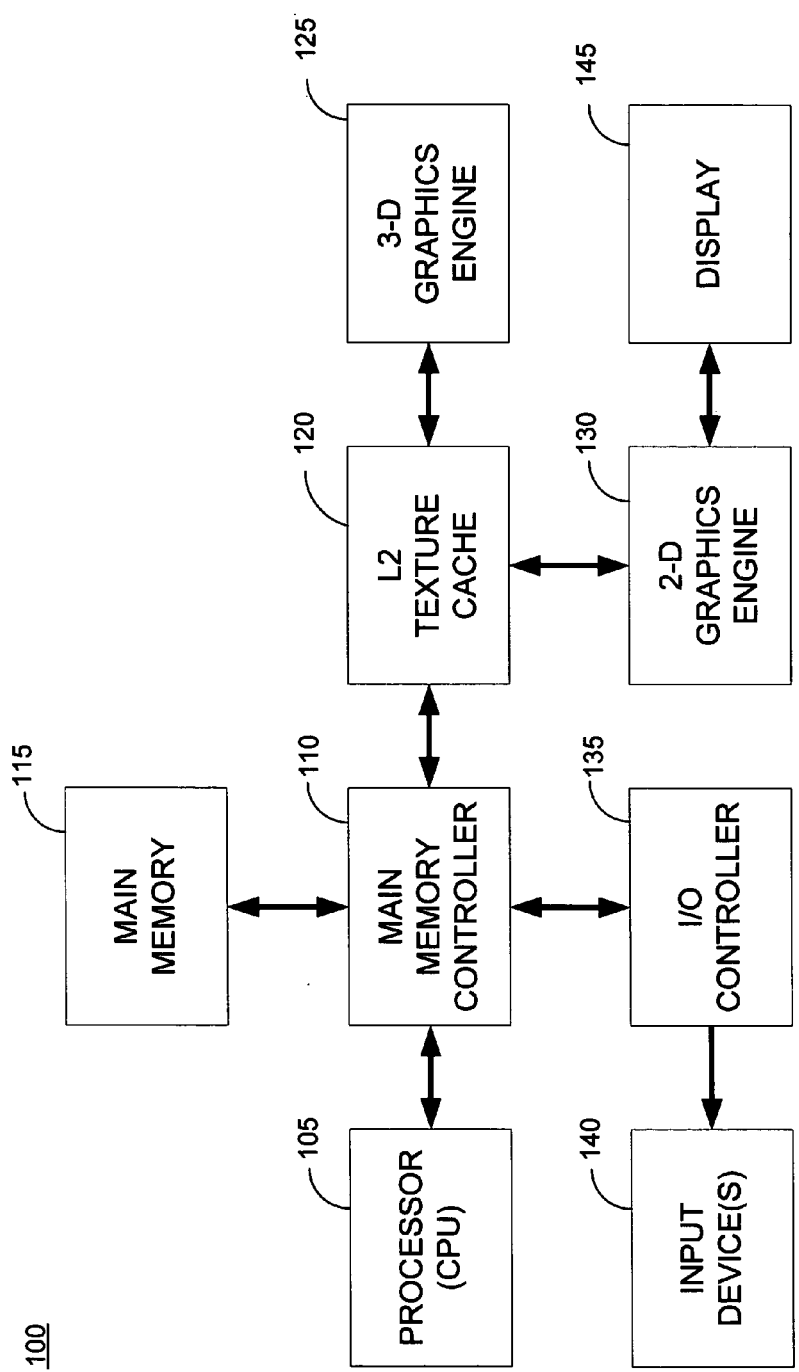
FIG. 1 is an illustrative depiction of a computer system, in accordance with some embodiments herein.

The following detailed description sets forth numerous specific details to provide a thorough understanding of the invention. However, those of ordinary skill in the art will appreciate that the invention may be practiced without these specific details. In other instances, well-known methods, procedures, protocols, components, and circuits have not been described in detail so as not to obscure the invention.

Embodiments herein may be implemented in hardware or software, or a combination of both. Some embodiments may be implemented as a computer program executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices. For purposes herein, a processing system may include any system that has a processor, such as, for example, a digital signal processor (DSP), a microcontroller, an application specific integrated circuit (ASIC), or a microprocessor.

The instructions and programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform operations described herein. Some embodiments may also be considered to be implemented as a machine-readable storage medium, configured for use with a processing system, where the storage medium so configured causes the processing system to operate in a specific and predefined manner to perform the functions described herein.

In some embodiments, a graphics processing system may include memory organized in tiles. Such a memory organization may offer fast and efficient memory accesses since, for example, a display screen may be efficiently divided into rectangular regions or tiles. Tiling may allow a graphics engine to access memory faster without causing an excessive number of page misses in the memory subsystem (i.e., improve hits). Graphics memory may be tiled using a number of different formats such as X-major tiling and Y-major tiling. In X-major tiling or tiled X format, two contiguous data structures (e.g., quadwords) in the X-direction are consecutive in physical memory. In Y-major tiling, two contiguous data structures (e.g., quadwords) in the Y-direction are consecutive in memory. Those skilled in the art will appreciate that a graphics engine, processor, system or subsystem may operate on a square region of graphics texture, a texel.

For a cache read request of a tiled organized memory in the X-direction (i.e., a tiled-X format read request), some memory systems may fragment the cache read request into two read requests because the requested data may encompass cache lines that are not contiguous in the memory. For example, a cache read request for 32B (byte) may correspond to two cache lines in cache since the cache may be accessed using only entire cache lines. In the event a cache line is 64B, the two cache lines may be 128B. However, fragmenting the cache read request into two read cache request to read the two cache lines will introduce additional latency since the two read cache requests are processed sequentially.

In some environments, back-to-back (i.e., consecutive) tiled-Y read requests may be symmetrically pipelined through a cache memory at 32 bytes per clock cycle whereas back-to-back tiled-X read requests may each be fragmented into two (2) read cache requests. An additional clock of latency may thus be introduced into the cache's pipeline for the tiled-X read request. For example, a cache read request for 32B (byte) may correspond to two cache lines in cache since the cache may be accessed using only entire cache lines. In the event a cache line is 64B, the two cache lines may be 128B. The tiled-X read request that is fragmented into two read cache requests may result in 32B of data being returned every 2 clock cycles, instead of 32B of data being returned every clock cycle as provided for a (non-fragmented) tiled-Y read request. There may be a desire to process tiled-X read requests as efficiently as tiled-Y read requests since, for example, graphics overlay and display use tiled-X format.

Embodiments herein may provide for selectively reading data from a tiled memory by one cache read request for two cache lines of data without fragmenting the cache read request. For example, one cache read request that requests two cache lines from memory may read the two caches lines in parallel. In this manner, the two cache lines may be read at the same time. This may allow a reduction or elimination of latency regarding the cache read request since, in accordance herewith, the one cache read request is not fragmented into two read requests, one for each desired cache line. This may provide for a reduction in latency associated with the cache read request made to the tiled memory.

FIG. 1 illustrates a functional block diagram of an embodiment 100 of an exemplary computer system including a graphics processor, system, subsystem, or generally, graphics engine 120 embodying some of the embodiments herein. System 100 may generally include a processing unit such as CPU (central processor unit) 105, a main memory controller 110, a main memory 115, an input/output controller 135, a Level 2 (L2) texture cache 120, a 3-D graphics engine 125, a 2-D graphics engine 130, a display 145, and a variety of input devices 140. 2-D graphics engine 145 may determine the graphical information that is to be sent to display 145, based on inputs from CPU 105 and data in main memory 115 and L2 texture cache 120. CPU 105 may access data stored on disk, networks, or CD-ROM, etc., programs booted at start up, and user inputs by the input devices. CPU 105 may determine a data stream (e.g., a read request) sent to graphics engine 120.

Memory 115 may be a dynamic random access memory (DRAM) device, a static random access memory (SRAM) device, double data rate memory, or other memory device. Memory 115 may store instructions and/or data represented by data signals that may be executed by CPU 105, 3-D graphics engine 125, 2-D graphics engine 130, or some other device. The instructions and/or data may comprise code for performing any and/or all of the techniques of the present invention. Memory 115 may also contain software and/or data. L2 texture cache 12 may be used to speed up memory accesses by the 3-D graphics engine 125 by taking advantage of its locality of access. Those skilled in the art will appreciate that L2 cache memory 120 may reside internal or external to the CPU 105 or graphics engines 125, 130.

FIG. 1 is for illustrative purposes only. For example, various embodiments of the methods and systems herein may be used in an integrated, discrete, or other graphics configuration.

FIG. 2 is an exemplary flow diagram of a method or process 200 in accordance with some embodiments herein. In some embodiments herein, a cache read request may request two cache lines from the memory. The request for two cache lines may result from the organization of the memory. For example, it may be the case that the memory may be accessed in cache line sized units. As an example, a cache read request for 32B may invoke read requests of two 64B cache lines, where a desired 16B of the cache read request is located in each cache line. Since the memory system uses cache lines, the request for 128B may be made to memory.

At operation 205, for one cache read request to a tiled cache memory, two cache lines are requested from the memory. It is noted that in accordance with embodiments herein, the one cache read request is not fragmented into two discrete cache read requests, one for each cache line request.

At operation 205, data associated with the two cache lines is returned to the requestor. The requestor may be a CPU or other processor or other device.

Process 200, by not fragmenting the one cache read request for two cache lines into two cache read requests, may be used to avoids, reduce, or eliminate a need to fragment cache memory read requests. The avoidance of a fragmentation of the cache read request may improve an efficiency and performance of the memory system by not introducing additional latencies attributed to a fragmentation operation. In some embodiments, the cache read request is for a tiled-X format read request.

Figure 3:
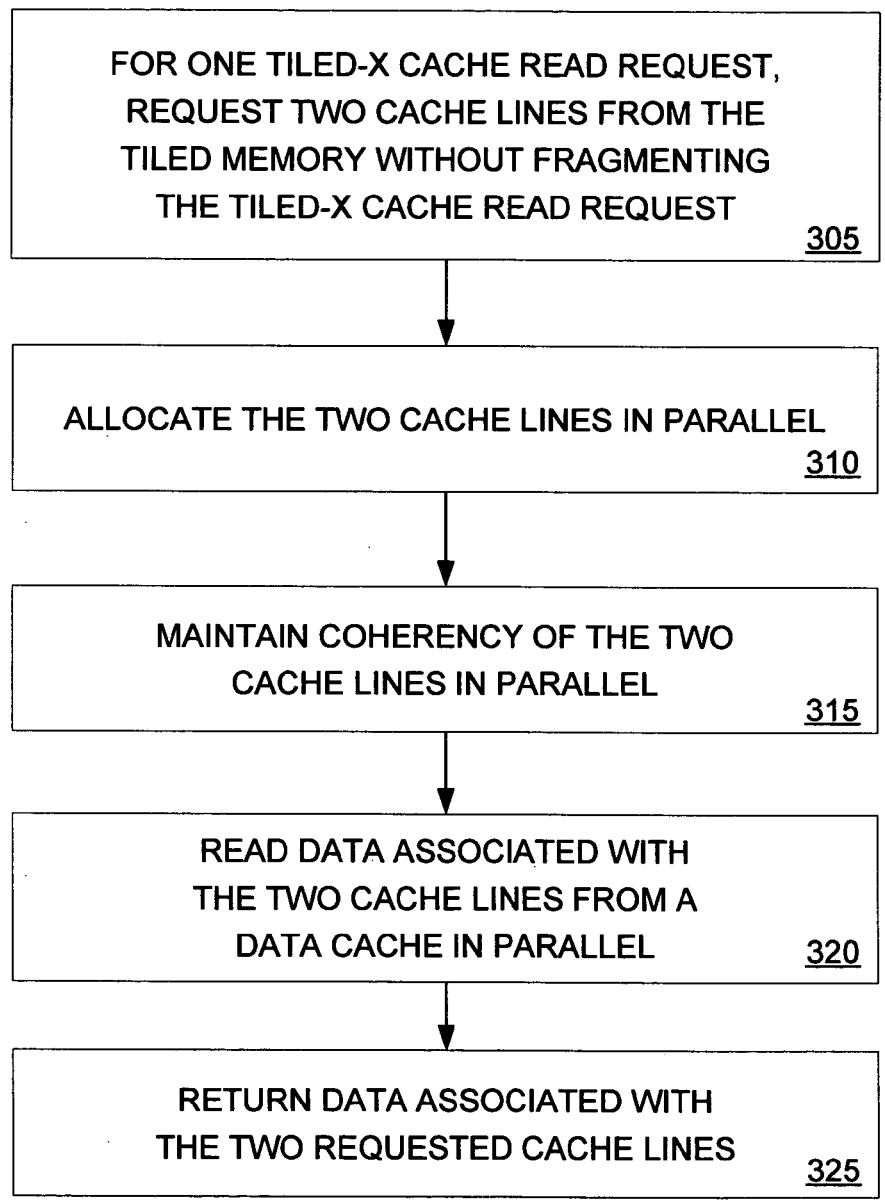
FIG. 3 an exemplary flow diagram, in accordance with some embodiments herein.

FIG. 3 is an exemplary flow diagram of a method or process 300, in accordance with some embodiments herein. Operations 305 and 325 of process 300 may be substantially similar to operations 205 and 210 of FIG. 2, respectively. Accordingly, an understanding of operations 305 and 325 may be readily had by referring to the discussion of operations 205 and 210 hereinabove.

In accordance with some embodiments herein, operations 310, 315, and 325 of process 300 illustrate some mechanisms that facilitate the reading of data from a tiled memory wherein one a cache read request may be used to request two cache lines from the memory.

At operation 310, the two cache lines corresponding to or associated with the one cache read request may be allocated in parallel. That is, a determination of whether there is a hit or miss of the requested cache read request in either of the two cache lines associated therewith and which cache lines to replace or use may be done for both cache line at the same time (i.e., in parallel). Gains in efficiency may be realized due, at least in part, to operation 310 since the cache lines may be allocated in parallel, as opposed to sequentially.

At operation 315, a coherency of the two requested cache line entries may be maintained in parallel. In this manner, the need to check the two cache line entries sequentially to protect or avoid over-writing to a cache line due to, for example, a miss, may be accomplished on both cache lines at the same time (i.e., in parallel). For example, a determination of a miss on either of the cache line entries may cause a stall until the matched cache entry for either is complete.

At operation 320, data associated with the two cache lines may be read to fulfill the cache read request in parallel. The parallel data read may be accomplished using multiple cache data memory devise or a cache data device organized to accommodate parallel reads therefrom.

Operations 310, 315, and 320 may combine to effectuate an effective and efficient cache read request of two cache lines for the one cache read request. The aspects of parallel allocation, coherency maintenance, and data reads for the two cache lines, and the avoidance of a fragmentation of the cache read request may allow, provide, or otherwise contribute to a reduction in latency in a graphics system.

Figure 4:
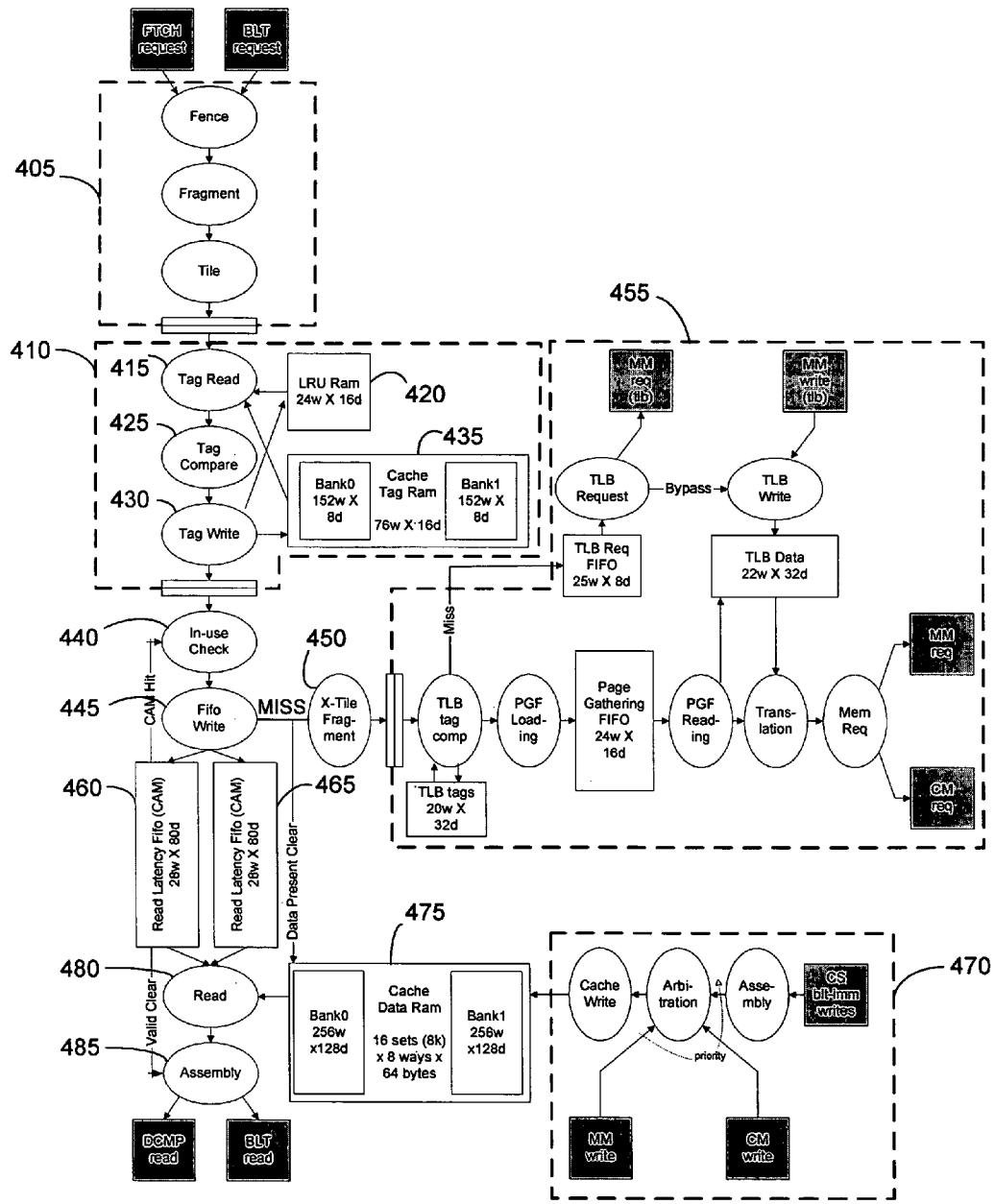
FIG. 4 illustrates an exemplary functional implementation, according to some embodiments herein.

FIG. 4 is an exemplary implementation of a pipeline, device, or system for some embodiments herein, generally referenced by numeral 400. A tiled-X read request address may be received, provide or otherwise obtained by system 400. In an instance a read request address is provided as a linear memory address or otherwise not provided as a tiled memory address, module 405 may provide a mechanism to translate a source memory address into a tiled-X format memory address. Functionally, module 405 may operate to fence, fragment, tile, and perform other functions on the source memory address to obtain a tiled-X memory address that may be further processed and mapped by the tile organized memory system herein.

At module 410, the tiled-X read request address is checked against two cache tag random access memories (RAMs) in parallel to determine whether the tiled-X read request address is located in cache or is to be retrieved from a system or main memory. For the desired read request, a check is done to determine whether or not the memory location is in the fast cache (e.g., level 2, L2, cache). A comparison of the tiled-X read request address to all of the tags in the cache that might contain the address is performed. The tag of the tiled-X read request address is read by 415 and compared against each of the two banks (Bank0 and Bank1) of the cache tag RAM 435 by tag compare device 425. In an instance the memory location is in the tag cache, a cache hit is said to have occurred. In the instance of the cache hit, the processor may read the data indicated by the tiled-X read request address.

In the instance the memory location is not in the tag cache, a cache miss is said to have occurred. In this case, module 410 may allocate a new tag entry for the memory address just missed. Device 430 may be used to write the tag to cache tag RAM 435. The allocation may include a tag for the just missed memory address and a copy of the data from the just missed memory address.

In some embodiments, a 2-bit hit indicator may be used to indicate whether a hit or miss occurs for the tiled-X read request address regarding the cache tag RAM 435. Table 1 below is an exemplary table that includes a listing of the various results that may be provided by the comparison of module 410. As shown, the 2 bit hit indicator is sufficient to include all possible outcomes of the cache tag RAM comparison.

TABLE 1

| RESULTS FROM BOTH TAG CAMS | HIT[1:0] |
|---|---|
| Hit to Both 64 Byte Cache Entries | 11 |
| Hit to the Second 64 Byte Cache Entry Only | 10 |
| Hit to the First 64 Byte Cache Entry Only | 01 |
| Miss to Both 64 Byte Cache Entries | 00 |

In the event there is a miss in either one of the two banks of 64B cache tag RAM, the tiled-X read request address is written to one of the 8 ways for a given set in the missed bank of cache tag RAM 435. This assumes each bank of cache tag RAM is organized as an 8-way set-associative tag. Other configurations of the banks of the cache tag RAM may be used. In this manner, both banks of cache tag RAM, for a given set, will have the same tiled-X read request address (e.g., tag) in one of their ways for the given set.

In the event there is a miss in both of the two banks of 64B cache tag RAM 435, the tiled-X read request address is written to one of the 8 ways for the same set in both banks of cache tag RAM 435. In this manner, both banks of cache tag RAM will have the same tiled-X read request address (e.g., tag) in the same one of their ways for the same set in both banks of cache tag RAM 435.

LRU RAM device 420 may be used to select the set to which the tags are written to the banks of cache tag RAM 435. The replacement policy for determining where to write the tags may be governed by a least recently used (LRU) algorithm. It should be appreciated that control other replacement policies may be used (e.g., random, etc.).

The tag RAM comparison of 410, using two banks in cache tag RAM 435, may be performed in parallel. That is, two banks of banks in cache tag RAM may be checked in parallel to gain increases herein, including an improvement in hit performance. This aspect of pipeline 400 may correspond to operation 410 of process, FIG. 4.

Pipeline 400 proceeds to forward the tiled-X read request address to an in-use check device or mechanism 440. In-use check device 440 may be provided to protected from using or attempting to use a cache line that is currently in used by other processes.

At 445, it is seen that two FIFOs may be written to simultaneously. In this manner, the two requested cache lines need not be processed sequentially, thereby adding latency to pipeline 400. The two memory read latency FIFOs 460 and 465 are checked regarding a missed tiled-X cache entry request and an adjacent entry (i.e., two cache lines). That is, the missed tiled-X cache entry (e.g., 64B) request and a second adjacent entry (e.g., 64B) are checked using the latency FIFOs 460 and 465. In an instance it is determined that the there is a cache entry match for either of the two latency FIFOs 460, 465, the missed tiled-X cache entry (i.e., the first cache entry) is stalled until the matched cache entry in either of the latency FIFOs 460, 465 is complete. In this manner, data coherency may be maintained. The missed tiled-X cache entry is stalled until the matched cache entry in either of the latency FIFOs 460, 465 can completely obtain other needed data. This aspect of pipeline 400 may correspond to operation 315 of process 300, FIG. 3.

Referring to the MISS path of pipeline 400, in the event the tiled-X cache read request is a miss to both of the 64B cache entries, the tiled-X cache read request is divided into two (2) memory miss requests by X-tile fragment device or mechanism 450. For example, the second of the two memory miss requests may be incremented by 64B. In the event there is only a miss to the second of the 64B cache entries, the single miss request address may be incremented by 64B.

Using the two memory missed cached entry requests, module 455 operates to convert a virtual address of the miss cache entry requests to a physical address mapped to system or main memory (MM). Module 455 provides an exemplary implementation, along the miss path, of how the missed tiled-X cache entries may be fragmented and retrieved from physical memory using translation lookaside buffers (TLBS) and other address translation mechanisms. The translation from the virtual tiled-X cache entry request address to the physical address in main memory may be accomplished by module 450 using a number of virtual to physical address translation mechanisms, including TLBs of cached mappings of the system's main memory, TLB request FIFO, TLB data buffer, and a page gathering FIFO (PGF). Module 455 may retrieve the requested address locations, MM req., as shown.

Module 470 of pipeline 400 provides a mechanism to write the requested address data obtained by module 455 from main memory to a cache data RAM 475. The MM write of module 470 corresponds with the MM reg. of module 455. Cache data RAM 475 is organized, partitioned, or otherwise configured and managed to have data read therefrom in parallel. For example, cache data RAM 475 have two banks of RAM, a first Bank0 and a second Bank1. Such a configuration and management of cache data RAM 475 facilitates or provides a mechanism for reading data associated with the two cache lines of the cache read request to be read in parallel.

Accordingly, read device 480 effectively reads data associated with both read request cache lines in parallel. This aspect of pipeline 400 may relate to operation 320 of FIG. 3.

Pipeline 400 proceeds to assemble the requested data at 485 and further decompress the requested read for use by the CPU, display or other devices, or requesters.

Figure 5:
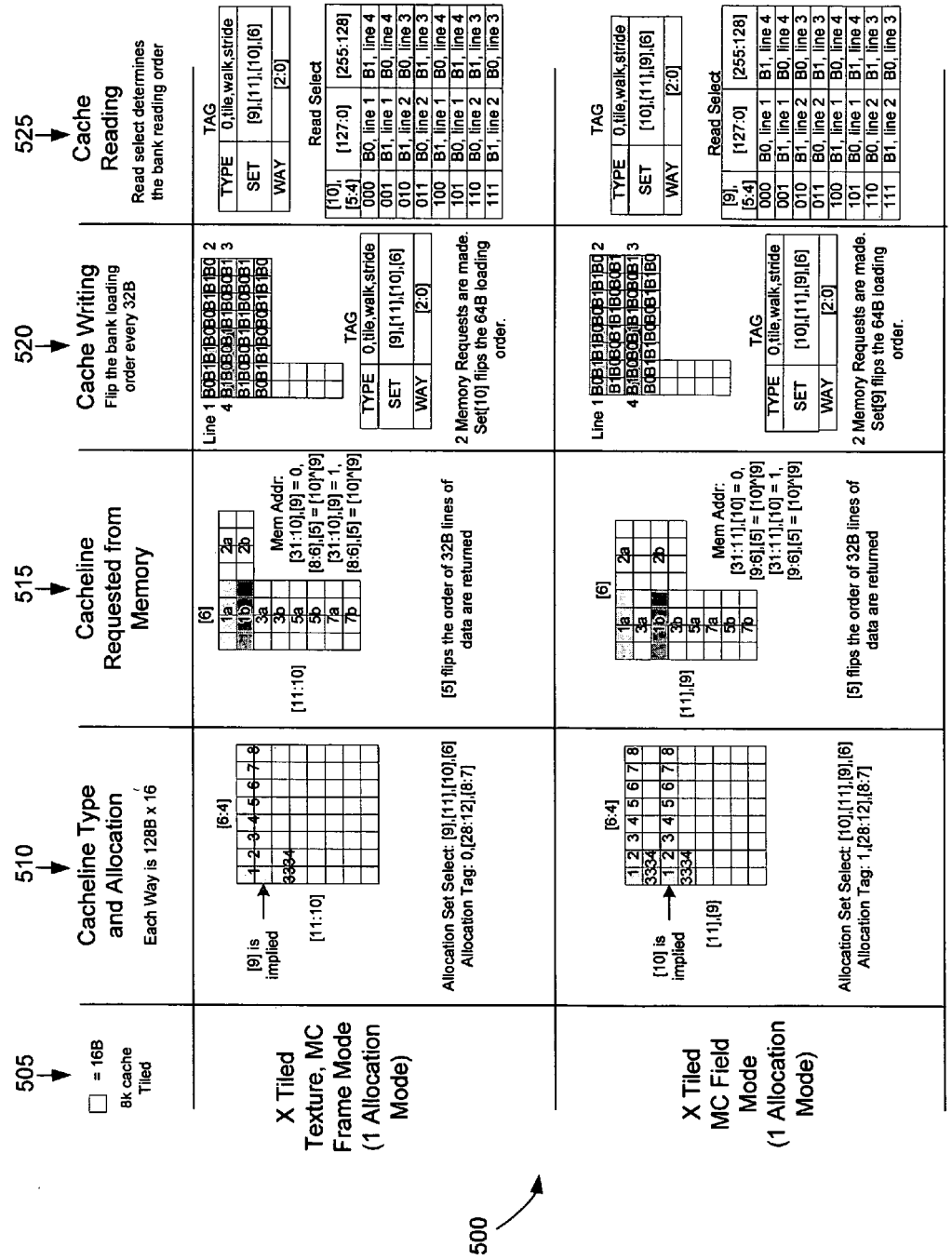
FIG. 5 is an exemplary illustration of some aspects of tiled cache memory management, in accordance with some embodiments herein.

FIG. 5 is an exemplary illustration of some aspects of tiled cache memory management, in accordance with some embodiments herein. For example, FIG. 5 provides a table 500 of various aspects of a cache read request in accordance with various aspects and embodiments herein. Aspects of a cache line type and allocation are shown in column 510, a cache line request from memory is illustrated in column 515, exemplary cache writing is depicted in column 520, and illustrative cache reading is shown in column 525. As illustrated in column 510 a read request for two 16B (32B total) are allocated consecutively or interleaved for X-tiled texture frame mode and X-tiled texture frame mode, respectively. At column 515, two cache lines 1a and 1b, each 64B are requested from memory. At column 520, a depiction of Bank0 and Bank1 cache writing is illustrated. It is noted that the banks are flipped so that Bank0 and Bank1 may be written to in parallel. At column, exemplary cache read formats are provided for illustrative purposes.

It should be appreciated by those skilled in the art that format of various address bits used or referenced in table 500 are provided for illustrative purposes only. That is different sizes of tiles, cache lines, allocation bits, referenced address bits, flip bits, etc. may be used without departing from the scope of some embodiments herein.

In some embodiments, instructions that when executed by a machine perform methods discussed in conjunction with some of the embodiments herein may be embodied in a medium or an article of manufacture. The article of manufacture may include a CD-ROM, fixed or removable storage mechanisms, random access memory (RAM), read only memory (ROM), flash memory, and other data storage and data delivery mechanisms.

The foregoing disclosure has been described with reference to specific exemplary embodiments thereof. It will, however, be evident that various modifications and changes may be made thereto without departing from the broader spirit and scope set forth in the appended claims.

What is claimed is:

1. A method for reading data from a tiled organized memory, comprising:
    in response to receiving one tiled-X read request to read two cache line size units from a tiled organized memory in the X-direction, requesting two cache lines from the tiled-X organized memory without fragmenting the received tiled-X read request into more than the one tiled-X read request;
    allocating the two cache lines in parallel;
    reading data associated with the two cache lines from a data cache in parallel; and
    returning, in parallel, data associated with the two requested cache lines, wherein the allocating, reading, and returning of the data is accomplished in one clock cycle.

2. The method of claim 1, further comprising:
    maintaining coherency of the two cache lines in parallel.

3. The method of claim 1, wherein the allocating comprises:
    checking, in parallel, an address for the tiled-X read request against two cache tag Random Access Memories (RAMs) to determine whether the tiled-X read request address is a hit or a miss relative to each of the two cache tag RAMs;
    in an instance the tiled-X read request address is a miss for one of the two cache tag RAMs, writing a tag for the tiled-X read request address in the missed one of the two cache tag RAMs; and
    in an instance the tiled-X read request address is a miss in both of the two cache tag RAMs, writing a tag for the tiled-X read request address in both of the two cache tag RAMs.

4. The method of claim 3, wherein the two cache tag RAMs comprise a first bank and a second bank of memory, respectively.

5. The method of claim 1, further comprising providing an indication of a full hit, full miss, and a partial hit regarding the two requested cache lines.

6. The method of claim 2, wherein the maintaining coherency comprises an in-use check of pending cache read requests.

7. The method of claim 2, wherein the maintaining coherency is performed by two read latency first in, first out buffers (FIFOs).

8. The method of claim 1, wherein the reading data comprises reading cache entries for each of the two cache lines from the data cache at the same time, wherein the data cache includes two banks of memory associated therewith.

9. An apparatus for reading data from a tiled organized memory, comprising:
    a host processor;
    a graphics engine coupled with the host processor;
    a cache tag random access memory (RAM) having a first bank and a second bank to allocate the two cache lines in parallel;
    a cache data RAM having a first bank and a second bank to read data associated with the two cache lines therefrom in parallel; and
    a tiled-X organized memory coupled to the graphics engine, wherein the graphics engine is operative to:
        request two cache lines from the tiled-X organized memory in response to receiving one tiled-X read request to read two cache line size units from a tiled organized memory in the X-direction, without fragmenting the received tiled-X read request into more than the one tiled-X read request;
        allocate the two cache lines in parallel;
        read data associated with the two cache lines from the cache data RAM in parallel; and
        return, in parallel, data associated with the two requested cache lines, wherein the allocating, reading, and returning of the data is accomplished in one clock cycle.

10. The apparatus of claim 9, further comprising:
    a pair of first in, first out buffers (FIFOs) to maintain coherency of the two cache lines in parallel.

11. The apparatus of claim 9, wherein an indication of a full hit, full miss, and a partial hit regarding the two requested cache lines is provided.

12. The apparatus of claim 9, wherein the allocating comprises:

checking, in parallel, the tiled-X read request address against the two cache tag RAMs to determine whether the tiled-X read request address is a hit or a miss relative to each of the two cache tag RAMs;

in an instance the tiled-X read request address is a miss for one of the two cache tag RAMs, writing a tag for the tiled-X read request address in the missed one of the two cache tag RAMs; and in an instance the tiled-X read request address is a miss in both of the two cache tag RAMs, writing a tag for the tiled-X read request address in both of the two cache tag RAMs.

13. A storage non-transitory medium having processor-executable programming instructions stored thereon that when executed by a processor cause:

requesting two cache lines from a tiled-X organized memory in response to receiving one tiled-X read request to read two cache line size units from a tiled organized memory in the X-direction, without fragmenting the received tiled-X cache read request into more than the one tiled-X read request;

allocating the two cache lines in parallel;

reading data associated with the two cache lines from a data cache in parallel; and returning, in parallel, data associated with the two requested cache lines, wherein the allocating, reading, and returning of the data is accomplished in one clock cycle.

14. The medium of claim 13, wherein the processor-executable programming instructions stored thereon, when executed by the processor, further cause:

maintaining coherency of the two cache lines in parallel.

15. The medium of claim 13, wherein the allocating comprises:

checking, in parallel, the tiled-X read request address against two cache tag Random Access Memories (RAMs) to determine whether the tiled-X read request address is a hit or a miss relative to each of the two cache tag RAMs;

in an instance the tiled-X read request address is a miss for one of the two cache tag RAMs, writing a tag for the tiled-X read request address in the missed one of the two cache tag RAMs; and in an instance the tiled-X read request address is a miss in both of the two cache tag RAMs, writing a tag for the tiled-X read request address in both of the two cache tag RAMs.

16. The medium of claim 13, wherein the processor-executable programming instructions stored thereon, when executed by the processor, further cause providing an indication of a full hit, full miss, and a partial hit regarding the two requested cache lines.

17. The medium of claim 14, wherein the maintaining coherency comprises an in-use check of pending cache read requests.

18. The medium of claim 13, wherein the reading of data comprises reading cache entries for each of the two cache lines from the data cache at the same time, wherein the data cache has two banks of memory associated therewith.

19. A system for reading data from a tiled memory comprising:

a host processor;

a graphics engine coupled with the host processor;

a cache tag random access memory (RAM) having a first bank and a second bank to allocate the two cache lines in parallel;

a cache data RAM having a first bank and a second bank to read data associated with the two cache lines therefrom in parallel; and a tiled-X organized memory coupled to the graphics engine, wherein the graphics engine is operative to:

in response to receiving one tiled-X read request to read two cache line size units from a tiled organized memory in the X-direction, request two cache lines from the tiled-X organized memory without fragmenting the received tiled-X read request into more than the one tiled-X read request;

allocate the two cache lines in parallel;

read data associated with the two cache lines from the cache data RAM in parallel; and return, in parallel, data associated with the two requested cache lines, wherein the allocating, reading, and returning of the data is accomplished in one clock cycle; and a double data rate memory coupled to the host processor.

20. The system of claim 19, wherein the graphics engine and the tiled memory are co-located on a common printed circuit board (PCB).

21. The system of claim 19, wherein the allocating comprises:

check, in parallel, the tiled-X read request address against the two cache tag RAMs to determine whether the tiled-X read request address is a hit or a miss relative to each of the two cache tag RAMs;

in an instance the tiled-X read request address is a miss for one of the two cache tag RAMs, write a tag for the tiled-X read request address in the missed one of the two cache tag RAMs; and in an instance the tiled-X read request address is a miss in both of the two cache tag RAMs, write a tag for the tiled-X read request address in both of the two cache tag RAMs.

* * * * *